United States Patent Office 3,458,303
Patented July 29, 1969

3,458,303
METHOD OF PREPARING WAX COATED SLOW RELEASE FERTILIZERS
Steven G. Belak, Claymont, Del., and Robert H. Campbell, Brookhaven, Pa., assignors to Sun Oil Company, Philadelphia, Pa., a corporation of New Jersey
No Drawing. Filed Oct. 1, 1965, Ser. No. 492,287
Int. Cl. C05c 9/00
U.S. Cl. 71—64                        4 Claims

ABSTRACT OF THE DISCLOSURE

A wax coated prilled fertilizer with increased water resistance is prepared by dispersing solid fertilizer in molten wax which has a melting point of at least 100° F., forming the dispersion into particles and quenching the particles in a liquid which is maintained at a temperature of (1) at least 80° F. and (2) less than 65° F. below the melting point of the wax.

---

This invention relates to an improvement in known methods of forming slow release fertilizers.

Slow release fertilizers are well-known. In one such fertilizer wax is utilized to reduce leaching of the fertilizer component by water and can be formed, for example, by mixing, i.e., dispersing, a solid fertilizer in molten wax, forming the resulting slurry or dispersion into small discrete particles, and cooling the resulting particles below the melting point of the wax in order to solidify same. Such slow release fertilizers and the preparation thereof are described in copending application Ser. No. 308,251, filed Sept. 11, 1963, now Patent No. 3,252,786. The solid fertilizer can be any of the conventional solid fertilizers, examples of those in frequent use at the present time being urea, ammonium nitrate, potassium chloride, mono and diammonium phosphate, calcium cyanamide, ammonium sulfate, sodium nitrate, potassium phosphate, potassium nitrate, potassium sulfate, superphosphate (a mixture of calcium acid phosphate and calcium sulfate), triple superphosphate (calcium acid phosphate), and mixtures thereof.

The wax can be of any type, e.g., animal, vegetable, or mineral wax, but is preferably a petroleum wax, i.e., paraffin wax or microcrystalline wax. More preferably the wax is paraffin wax. Paraffin waxes generally have a melting point of 110–165° F. (ASTM D–127) a penetration at 77° F. of 5–25 dmm. (ASTM D–1321–10. Og., 5 sec.) and a viscosity at 210° F. of 30–50 S.U.S. (ASTM D–446). Corresponding properties of the microcrystalline waxes are 140–210° F., 5025 dmm., and 60–100 S.U.S., respectively.

If desired, various additives can be incorporated into the wax. The aforesaid copending application discloses the use of rosin and asphalt as additives in wax-containing slow release fertilizers, the rosin being used to improve the water resistance of the fertilizer and the asphalt being used to increase the fluidity of the fertilizer-molten wax dispersion. The amount of each of these additives is normally 1–10% by weight of the wax phase, the latter being the wax and all additives dissolved therein. The solid discrete slow release fertilizer particles will normally be substantially spherical in shape with a diameter less than ³⁄₃₂ inch, usually less than ¹⁄₁₆ inch.

The present invention relates to an improvement in one of the known methods of forming the fertilizer-molten wax dispersion into discrete solid slow release fertilizer particles. It is known to convert the dispersion of fertilizer in molten wax into such particles by forming the dispersion into discrete particles, i.e., droplets, of solid fertilizer in molten wax, and then allowing the droplets to fall into a body of liquid, usually aqueous liquid, maintained at a temperature below the melting point of the wax or wax phase as the case may be. In other words the droplets of the dispersion of fertilizer in molten wax are solidified by quenching. The forming of the gross dispersion of solid fertilizer in molten wax into discrete particles can be by any known method, such as by flowing the dispersion from the surface of a rotating disk, forcing the dispersion through a nozzle or orifice of suitable size, etc. These and many other schemes are known. See for example, our copending application Ser. No. 308,181, filed Sept. 11, 1963, now Patent No. 3,242,237, and U.S. Patent Nos. 2,939,781, 2,790,201, 2,908,041 and 1,538,730.

We have now found that when discrete particles of solid fertilizer in molten wax are quenched in a body of liquid, e.g., water, the temperature of the water has a marked influence upon the water resistance of the resulting solid slow release fertilizer. This is shown more clearly by the following examples.

Into a mixing vessel equipped with heating and stirring means is charged 36 parts of a paraffin wax having a melting point of 129° F. The wax is heated to 200° F. after which two parts of polymerized wood rosin and two parts asphalt are added to the wax. The resulting mixture is stirred until both additives have dissolved in the wax after which 60 parts crystal urea are added thereto. The resulting mixture is then passed through a roller mill having a roller clearance such that any material discharged therefrom has a particle size smaller than 200 mesh (U.S. Sieves). Roller milling of the mixture effects both subdivision of the urea and uniform dispersion of the urea in the wax phase. The discharge from the mill is solid because of solidification of the wax but upon reheating to about 150° F. it is fluid.

The fluid dispersion at 150° F. is charged to a vessel having a discharge line equipped with a valve in the bottom thereof. The dispersion is allowed to flow out of the vessel with the valve being adjusted so that the discharge is in the form of droplets rather than as a solid stream. The droplets are allowed to fall into a container full of water, the temperature of which is described hereinafter. The length of free fall of the droplets is about 12 inches. Upon being immersed in water the droplets solidiy and are then removed from the water. The solid particles so obtained are substantially spheircal in shape and have a diameter of about ¹⁄₃₂–¹⁄₁₆ inch.

The temperature of the water is varied as shown in Table I below which also shows the water resistance of the particles obtained at each quenching temperature. Water resistance is determined by immersing a known weight of particles in water at room temperature for 400 hours and then measuring the amount of urea which has dissolved in the water. Since the amount of urea in the original sample is known the percentage thereof which is dissolved in the water, hereinafter referred to as the percent urea released, can be readily calculated.

Table I

| Quenching water temperature—° F.: | Percent urea released |
|---|---|
| 23 | 52 |
| 40 | 45 |
| 60 | 39 |
| 80 | 29 |

EXAMPLE II

The procedure is the same as in Example I except that the wax used has a melting point of 156° F. and somewhat different water temperatures are employed. The results are as follows:

Table II

| Quenching water temperature—° F. | Percent urea released |
|---|---|
| 40 | 81 |
| 60 | 74 |
| 90 | 67 |
| 110 | 53 |

From the data contained in Tables I and II it is clearly apparent that the water resistance of the fertilizer is directly proportional to the water temperature. In general, the water temperature should be above 70° F., preferably above 80° F., more preferably above 90° F. It is also evident from the data in Tables I and II that as the melting point of the wax increases the water temperature required to obtain the same water resistance increases. This is due to the fact that lower melting waxes inherently impart better water resistance to a fertilizer than higher melting waxes. For waxes melting below 140° F., water temperatures of 80–100° F. will normally be employed whereas with waxes melting over 140° F. water temperatures of 95–120° F. will normally be employed. Stated in another manner the difference between the wax melting point and the water temperature will usually be less than 80° F., more frequently less than 65° F., and preferably is less than 50° F.

It should be noted that when the particles of fertilizer dispersed in molten wax are solidified by allowing them to fall through a column of air the water resistance of the fertilizer does not vary significantly over the range of air temperatures normally used in practice. This is probably due to the fact that there is not a significant difference in cooling rates with such air temperatures.

The invention claimed is:

1. In a process in which a dispersion of solid fertilizer in a molten wax, said wax having a melting point of at least 100° F., is formed into small discrete particles which are then quenched in a body of liquid to solidify said molten wax and thereby to obtain discrete particles of a solid slow released fertilizer, the improvement for increasing the water resistance of said solid slow release fertilizer particles which comprises maintaining the temperature of said body of liquid at (1) at least 80° F. and (2) less than 65° F. below the melting point of said wax.

2. Process according to claim 1 wherein the temperature of said body of liquid is at (1) at least 90° F. and (2) less than 50° F. below the melting point of said wax.

3. Process according to claim 1 wherein said fertilizer is urea.

4. Process according to claim 1 wherein said wax is paraffin wax.

References Cited

UNITED STATES PATENTS 3,242,237   3/1966   Belak et al.

S. LEON BASHORE, Primary Examiner

I. G. FERRIS, Assistant Examiner

U.S. Cl. X.R.

71—28